Figure 1:
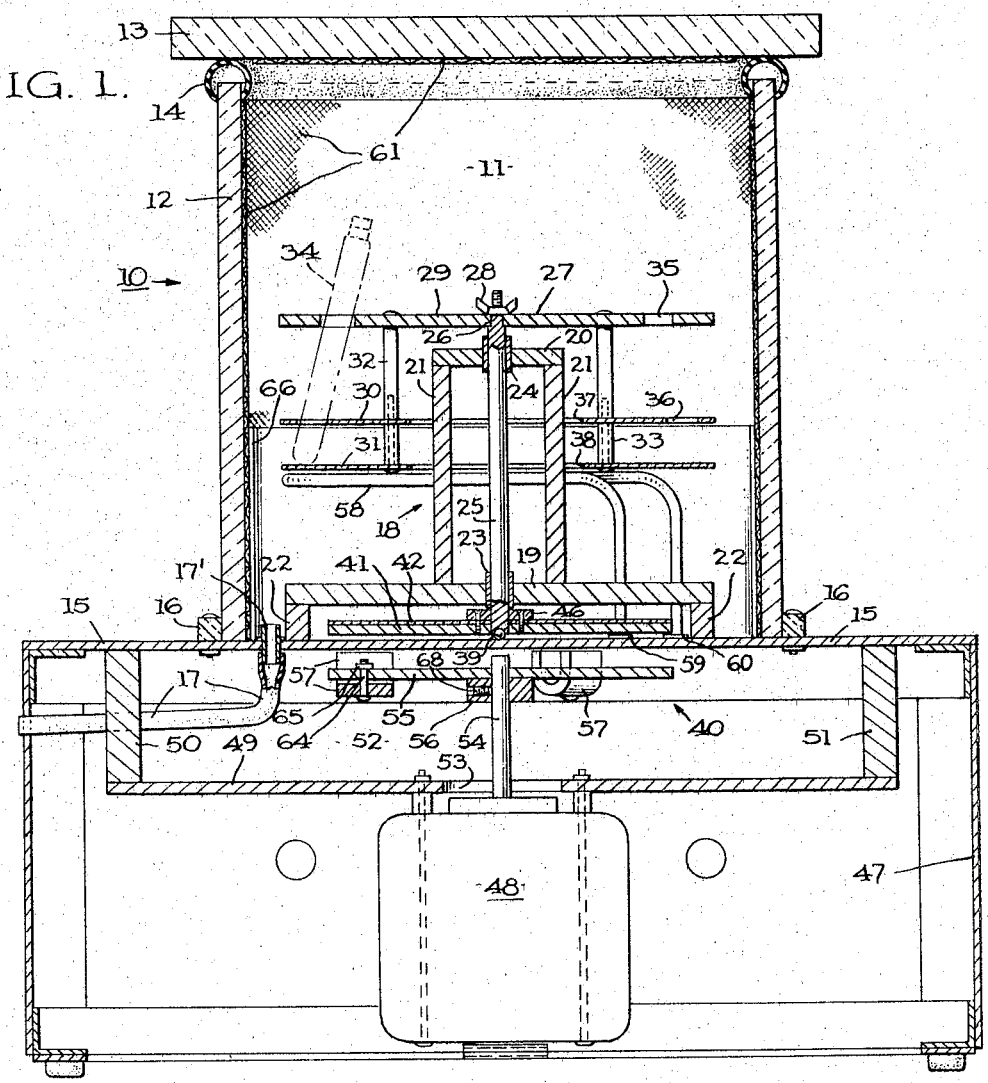

Feb. 21, 1967  J. A. ONTKO ET AL  3,304,990
EXPLOSION PROOF CENTRIFUGAL EVAPORATOR
WITH MAGNETIC DRIVE
Filed Feb. 15, 1965

INVENTORS
JOSEPH A. ONTKO
RICHARD F. JONES
BY
Cameron, Kerkam & Sutton
ATTORNEYS

United States Patent Office 3,304,990
Patented Feb. 21, 1967

3,304,990
EXPLOSION PROOF CENTRIFUGAL EVAPORATOR
WITH MAGNETIC DRIVE
Joseph A. Ontko and Richard F. Jones, both of Memphis, Tenn., assignors to The University of Tennessee Research Corporation, Knoxville, Tenn., a corporation of Tennessee
Filed Feb. 15, 1965, Ser. No. 432,744
11 Claims. (Cl. 159—6)

The present invention relates generally to centrifugal evaporators and more particularly to an explosion proof centrifugal evaporator for evaporating flammable solvents.

The evaporation of organic solvents from a series of solutions is an indispensable process in a wide variety of procedures in analytical chemistry. A solution is a solvent having a solute dissolved in the solvent and, in nearly all cases, the solute must be isolated from the solvent. Problems associated with such a process include the explosive nature of many organic solvents, the bumping and foaming of liquids during evaporation, the lability of the compounds undergoing concentration, particularly in the case of biological preparations, and, in many cases, the multitude of samples which require evaporation.

Presently available devices for isolating a dissolved solute from its solution utilize either a heating bath or a rotary evaporator, but such devices suffer from serious disadvantages and are incapable of overcoming these problems. Where the solute is isolated by means of a heating bath, a heating block is generally utilized to effect evaporation of a number of solvents simultaneously. When flammable solvents are undergoing evaporation, the solvent is boiled at atmospheric pressure resulting in a hazardous explosive condition. In addition, the solutes which are heated to the boiling point of the solvent are subjected to even higher temperatures when the evaporation is nearly complete. Labile compounds may therefore undergo partial or complete degradation. Also, occasional losses may result from violent bumping due to superheating or foaming which is usually associated with low surface tension. In the case of a rotary evaporator, such devices may be operated under a reduced pressure at mild temperatures to reduce foaming. However, rotary evaporators generally accommodate only one sample at a time.

Accordingly, it is the principal object of the present invention to provide an explosion proof centrifugal evaporator for evaporating flammable solvents safely.

Another object of the present invention is to provide an explosion proof centrifugal evaporator for simultaneously evaporating several samples of solution and isolating the solutes from the solvents.

A further object of the present invention is to provide an explosion proof centrifugal evaporator for evaporating solvents which prevents destruction of sensitive (labile) solutes.

These and other objects and advantages of the present invention will become apparent from the following description of the invention which comprises a centrifugal evaporator for evaporating organic solvents from solutions having a vacuum chamber which is completely isolated from the driving elements. The centrifuge is driven by a magnetic drive external to the vacuum chamber which is adapted to be evacuated by a suitable vacuum pump. A small heating element within the centrifuge chamber may be utilized to accelerate the rate of evaporation, and the centrifuge chamber is lined with metal screening which is grounded to remove static electricity.

The solutions to be processed are normally contained in small test tubes or containers from which aliquots are readily transferred to test tubes when the solvent needs to be either partially removed to concentrate the solution or completely removed, usually to redissolve the sample in a different solvent. The samples in the test tubes are placed in the centrifuge rotor or head which is adapted to receive up to twenty samples. During evaporation, which proceeds readily when the chamber is evacuated, the high gravitational force prevents loss of solution from foaming or bumping, and the temperature of the solution decreases during solvent evaporation. Evacuation of the chamber greatly decreases the exposure of solutes to oxygen and, as a result, molecular alterations potentially induced by oxygen and heat are therefore minimized or eliminated.

While the specification concludes with claims particularly pointing out and distinctly claiming the subject matter of the invention, it is believed that the invention will be better understood from the following description taken in connection with the accompanying drawings wherein like reference characters indicate like parts throughout the several views.

Figure 2:
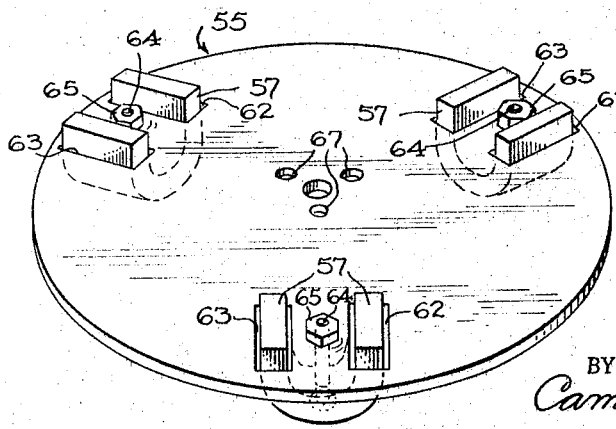

FIGURE 1 is an elevational section view of the centrifugal evaporator of the present invention; and FIGURE 2 is a perspective view of the magnetic drive disc.

Referring now to the drawing, and more particularly to FIGURE 1, reference numeral 10 indicates generally the centrifugal evaporator comprising a centrifugal vacuum chamber 11. Centrifugal vacuum chamber 11 is advantageously fabricated from a transparent material such as, for example, Lucite, Plexiglas, glass or the like and includes a cylindrical wall 12 and a removable top plate or cover 13. Sealing between the top plate 13 and cylindrical wall 12 of the chamber is effected through a suitable rubber gasket 14.

The lower end of the vacuum chamber 11 is attached to base plate 15 and is supported thereon by means of an annular support ring 16 enclosing wall 12. Suitable sealing means such as, for example, a silicone rubber adhesive cement seals the base of ring 16 and wall 12 to the base plate 15. Alternatively, a split rubber tubing gasket may be employed to seal the wall 12 to base plate 15. The vacuum chamber 11 is evacuated through a conduit 17 having one end connected to a vacuum pump or water aspirator (not shown) and its other end in communication with the vacuum chamber. To this end, a suitable fitting 17' may be disposed in the base 15 to which the conduit 17 is connected.

Within the vacuum chamber 11, there is provided a centrifuge 18 supported on base plate 15 and plates 19 and 20 which are spaced from each other by spacers 21. Plate 19 is spaced above base plate 15 by spacers 22. Plates 19 and 20 each support a bushing 23 and 24, respectively, within which is rotatably supported the centrifuge shaft 25. Shaft 35 is reduced in diameter at its upper end to provide a shoulder 26 on which is supported a centrifuge rack 27. Rack 27 may be conveniently secured for rotation with shaft 25 by means of wing bolt 28 threaded over the upper end of the shaft; however, any suitable means of affixing the rack to the shaft may be used. The lower end of shaft 25 is adapted to rest on a single ball thrust bearing 39.

The centrifuge rack 27 comprises three parallel plates 29, 30 and 31 spaced from each other by spacers 32 and 33 to facilitate tilting of the test tubes or ampoules carried thereby, one of which is shown in dotted lines as at 34. To this end, the upper or rotor plate 29 is provided with a plurality of radially spaced openings 35 through which the test tubes pass. The intermediate plate 30 is also provided with a corresponding set of openings 36; however, openings 36 are disposed further from the axis of the shaft 25 than the openings 35 so that the test tubes are carried in an inclined position of approximately 13° with respect to a vertical plane with their bases resting on the flat surface of the lower base plate 31. Intermediate plate 30 and base plate 31 are each provided with large clearance openings 37 and 38, respectively, to permit rotation of the plates about the spacer supports 21.

Rotation of the centrifuge 17 is effected through a magnetic drive assembly 40 which is completely isolated from the vacuum chamber 11. To this end, shaft 25 has affixed to its lower end, beneath plate 19 and above base plate 15, a metal disc 41 supported on the shaft 25 by collar 46. Disc 41 is constructed of a material having a high electrical conductivity and low magnetic permeability such as aluminum or copper and as a result of eddy currents generated in the disc by a rotating magnetic field, a rotating force is established on the disc which causes it to be rotated, thus spinning the shaft 25 and attached rack 27.

When reference is herein made to the permeability of a material, the relative permeability is meant which is the ratio of the magnetic flux density produced in the medium to that produced in a vacuum by the same magnetizing force. Accordingly, when reference is made to material having a low magnetic permeability, a material is meant which has a permeability less than 1.5 and exhibits little magnetic shunting effect. When reference is made to materials having a high permeability, a material is meant which has a permeability greater than 1800 and exhibits an appreciable magnetic shunting effect.

The high electrical conductivity of disc 41 allows high eddy currents to flow in the disc to produce the rotating torque; however, its low magnetic permeability does not give rise to a high flux density. Accordingly, a disc 42 having a magnetic permeability which is high relative to that of disc 41 is attached to the upper face of the disc 41 and serves as a magnetic flux return plate. Disc 42 may be fabricated of steel, iron or the like, and such a construction affords a higher flux density in the disc and results in a stalled torque approximately twice that when disc 41 is used alone.

The rotating magnetic field within the vacuum chamber is provided by the magnetic drive assembly 40 which is mounted within a housing 47 and includes a fractional horsepower motor 48 supported on plate 49. Plate 49 is spaced from the base plate 15 by spacers 50 and 51 to provide a clearance space 52 and has a clearance opening 53 through which the shaft 54 of the motor extends. Shaft 54 is in axial alignment with shaft 25 of the centrifuge and carries a driving wheel 55 affixed thereto by collar 56. The driving wheel 55 supports, in spaced intervals of approximately 120°, three U-shaped permanent magnets 57 disposed to establish a magnetic field within the vacuum chamber.

Driving wheel 55, as more clearly shown in FIG. 2, includes a pair of openings 62 and 63 for each of the U-shaped permanent magnets 57. The vertical arms of the magnets pass through the openings so that their pole faces face the base 15 and the magnetic field is directed into the vacuum chamber 11. Each of the magnets is secured to the wheel 55 by means of a nut and bolt 65 and 64, respectively, and the wheel is secured to the collar 56 by screws passing through openings 67. Collar 56 may be secured to shaft 54 in any convenient manner such as, for example, by set screw 68 adapted to bear on shaft 54.

The intensity of the magnetic field from each magnet at a selected point within the vacuum chamber is constant, so long as the motor is not energized. By arbitrarily picking a point within the chamber, it can be readily appreciated that the flux lines from each magnet contribute to the total magnetic field intensity at that point. As the wheel is displaced from its original rest position, a rotating magnetic field is established which causes eddy currents to be generated in the disc 41 which in turn cause a rotating force to be applied to the disc.

Advantageously, base plate 15, which is disposed between the disc 41 and wheel 53 so as to isolate the magnetic drive assembly 40 from the vacuum chamber 11, is fabricated from a metal having a low magnetic permeability and high electrical resistivity such as, for example, stainless steel to allow low loss trinsmission of the rotating magnetic field into the vacuum chamber.

In operation, the solution from which the solvents are to be removed are placed in test tubes or other suitable containers. As used in this invention, a solution is defined as a solvent plus a solute dissolved in the solvent. The test tubes are then positioned in the centrifuge rack which may be advantageously constructed to hold up to twenty samples. The vacuum chamber is then closed by positioning the cover in place and the centrifuge is started by energizing the motor. The rotating magnets establish the rotating magnetic field which causes the disc and attached elements to spin at a speed slightly less than that of the rotating magnets. The actual slippage or loss in transmission is approximately 10% in air and 4% in a partial vacuum of 2–17 mm. mercury. The chamber is then evacuated which results in the solvents being boiled-off. The high gravitational force of the spinning centrifuge and the vacuum prevents violent bubbling and destruction of the sensitive (labile) solutes which would otherwise occur by boiling the solvent at ordinary atmospheric pressure.

In accordance with the present invention, there may be provided a tubular heating element 58 of approximately 500 watts capacity disposed within the vacuum chamber 11. The heating element 58 is connected to a suitable energizing source through fittings 59 and 60 and is positioned below the base plate 31 of the centrifuge rack 27. Base plate 31 is made of a good heat absorbent material and painted black to optimize the heat absorption. The heating element, when used, is only energized after evacuation of the vacuum chamber 11, and is useful for concentrating relatively large volumes of solvent, that is, when the test tubes are filled to maximum capacity, and for evaporating solvents with a high boiling point or a high heat of vaporization.

The heating element does not heat the sample to a temperature above its initial temperature, that is, the temperature of the sample when it is placed in the centrifugal evaporator which is usually room temperature since the solvents cool off as evaporation proceeds. Evaporation preceeds rapidly at first and then slows down, and evaporation proceeds throughout the temperature range starting at the initial temperature of the sample to the final low temperature.

To prevent accumulation of a static charge within the vacuum chamber 11, the wall 12 is lined with a wire mesh or screening 61 of aluminum which is grounded along with the metal parts of the evaporator. If desired, a window may be provided in the screening 61 to allow better visual observation of the solvent meniscus. To protect the wall 12 adjacent to the heating element 58 from damage due to heat generated by the heating element, a polished aluminum reflector 66 is disposed on the inside face of the screening 61. Since the heating element is supported on one side of the chamber 11, the reflector 66 may be semicircular; however, since various forms of heating elements may be utilized, the shape of the reflector may be modified accordingly. In addition, to reduce the danger of heat-induced damage to the wall 12 of the chamber 11, heating element 58 is adapted to be electrically connected to a voltage supply controlled to prevent the temperature of the wall from exceeding 50° C.

Advantageously, housing 47 is provided with a front panel (not shown) which supports external controls including the control knob of a variable transformer for regulating the voltage supply to the heating element 58, switches for the vacuum pump and the electrical motor 48 and a vacuum release valve to allow entry of air to the system when desired, usually after the evaporation is complete.

To determine the rate of evaporation for various organic solvents, 10 screw cap test tubes of 20 ml. capacity were placed in a 20-tube rotor, and positioned in the rotor at a 13° angle. In this position, these test tubes have a capacity of approximately 14 ml. Each test tube was filled with 10 ml. of a particular solvent and centrifuged. The time for complete evaporation under reduced pressure was determined as tabulated in Table I. A trap of Dry-Ice and methyl Cellosolve was used to condense vapors and a manometer was placed in the vacuum line to monitor the pressure. A variety of organic solvents such as diethyl ether, chloroform, petroleum ether, Skelly B and methanol were readily evaporated under these conditions. The use of a water aspirator for evacuating the system resulted in a pressure of 17–18 mm. Hg when the solvent was nearly gone.

Although chloroform and methanol have similar boiling points, chloroform evaporated much faster than methanol, thus reflecting the relatively high heat of vaporization of methanol. The time of evaporation was reduced 5–10% by replacing the water aspirator with a vacuum pump, and the pressure, when the vacuum pump was used for evacuation, was approximately 2 mm. Hg. when the solvent was nearly gone. The evaporation of chloroform and methanol proceeded slowly; however, when auxiliary heating was utilized, the rate of evaporation increased considerably, providing a substantial reduction in evaporation time.

TABLE I.—THE EVAPORATION TIME OF VARIOUS ORGANIC SOLVENTS IN THE CENTRIFUGAL EVAPORATOR

| Solvent | Boiling point or range, ° C. | Evaporation time, min.[1] | | |
|---|---|---|---|---|
| | | Water Aspirator | Vacuum pump | Vacuum pump with heating [2] |
| Diethyl ether | 34.6 | 17 | 16 | |
| Chloroform | 61.3 | 48 | 45 | 31 |
| Petroleum ether | 37–53 | 19 | 17 | |
| Skelly B | 62–70 | 28 | 25 | 18 |
| Methanol | 64.7 | 124 | 116 | 69 |

[1] The time required for the complete evaporation of 10 ml. of solvent in each of 10 tubes. A trap of Dry-Ice in methyl Cellosolve was used.
[2] With 87 volts supplied to the heater.

Table II illustrates the difference in the rate of cooling and evaporation of diethyl ether in the centrifugal evaporator embodying the present invention when utilizing a vacuum pump in place of a water aspirator. The use of a vacuum pump decreases the evacuation time; however, a more rapid cooling of the solvent results since, if heat is not supplied, a liquid undergoing evaporation cools off rapidly as molecules with higher energy enter the vapor phase. The vapor pressure of the liquid diminishes as its temperature decreases and therefore if the external pressure is constant, the evaporation decelerates. A concomitant decrease in the pressure of the system tends to reverse this decrease in evaporation rate. The gradual decrease in pressure in the system, however, was not sufficient to completely reverse the deceleration of the evaporation except in the early stage of evacuation when the water aspirator was used.

When diethyl ether or petroleum ether were evaporated, using the water aspirator, the trap condensed 75–85% of the solvent vapors. When the water aspirator was used without the aid of a trap in the system, the evaporation time of diethyl ether and petroleum ether was 19 and 21 minutes respectively, as compared with 17 and 19 minutes respectively when a trap was present. Under these conditions, the use of a trap reduced the evaporation time by only 10% thus demonstrating that the solvent vapors were effectively removed by the water aspirator.

Two tubes, each containing 10 ml. of diethyl ether, were centrifuged and the system was evacuated for the indicated periods. The motor which spins the magnetic field was stopped 30 sec. before the end of the evaporation period, indicated below, to allow the rotor to slow down. At the desired time, the line pressure was recorded, the vacuum release valve was opened and the pump was turned off. The rotor was nearly stopped at this time. The temperature and volume of the solvent were then measured.

TABLE II.—EFFECT OF EVACUATION PUMP TYPE ON THE RATES OF COOLING AND EVAPORATION OF DIETHYL ETHER IN THE CENTRIFUGAL EVAPORATOR

| Time, min. | Water Aspirator | | | Vacuum pump | | |
|---|---|---|---|---|---|---|
| | Temperature,[1] ° C. | Volume, ml. | Pressure, mm. Hg | Temperature,[1] ° C. | Volume, ml. | Pressure, mm. Hg |
| 0 | 26 | 10.0 | | 26 | 10.0 | |
| 2 | 22 | 8.8 | | 0 | 6.1 | 80 |
| 4 | 11 | 6.6 | | −21 | 3.2 | 7 |
| 6 | 3 | 4.4 | 102 | | 2.0 | 4 |
| 10 | | 1.3 | 26 | | 0.6 | 3 |

[1] When the sample volume was appreciably less than 3 ml., the temperature as measured was not representative due to warming of the solvent by the introduction of air and the thermometer bulb.

Reducing the number of tubes containing solvent in the centrifugal evaporator also affects the evaporation time. With all solvents tested, it was observed that the evaporation of solvent in two tubes, each containing 10 ml. of solvent, required 20% less time than the evaporation of this volume of solvent in each of ten tubes. This comparison was made with a trap containing Dry Ice and methyl Cellosolve without the use of auxiliary heating.

Tubes with an equal volume of the same solvents should be centrifuged opposite each other for balancing. When each tube contains the same initial volume of the same solvent, the course of evaporation may be followed visually. When the rotor is spinning, the meniscus is visible through the cylindrical Plexiglas or Lucite housing if eight or more tubes are evenly spaced in the rotor. However, when fewer tubes are spinning, the meniscus is not clear when the tubes are centrifuged. Also, near the end of the evaporation, when small amounts of solvent remain, the meniscus is not readily observed regardless of the number of tubes being centrifuged. Under these conditions, a stroboscope may be utilized to provide a clear image of the solvent level in the spinning tubes. On the other hand, after the initial period of rapid evaporation, if the motor is turned off long enough to allow the rotor to slow down almost to a stop, the solvent meniscus becomes clearly visible. Such momentary reduction in speed does not cause solvent loss from bumping.

From the above description of the present invention, it will be obvious to those skilled in the art that the inventive concept is capable of a variety of mechanical modifications. It is therefore intended by the appended claims

What is claimed is:

1. A centrifugal evaporator comprising a housing having a motor supported therein, means affixed to the shaft of said motor and adapted for rotation upon energization of said motor, a plurality of permanent magnets carried by said means, a vacuum chamber having a base supported on said housing, a centrifuge within said chamber including a shaft and a rack mounted thereon for supporting samples of solutions from which the solvents are to be evaporated, a metal disc disposed on said shaft and adapted for rotation therewith to drive said rack in response to rotation of said means wherein said chamber is lined with an electrically grounded wire mesh.

2. A centrifugal evaporator as set forth in claim 1 further including a heating element in said chamber for accelerating the rate of the evaporation.

3. A centrifugal evaporator as set forth in claim 1 wherein said base is of a low magnetic permeability and high electrical resistivity to allow low loss transmission of the magnetic field into the vacuum chamber.

4. A centrifugal evaporator as set forth in claim 3 wherein said disc is of a high electrical conductivity and low magnetic permeability.

5. A centrifugal evaporator as set forth in claim 4 wherein said disc includes a pair of plates, one of said plates having a magnetic permeability greater than that of the other plate, the free face of said plate having the lower magnetic permeability being disposed to face said permanent magnets.

6. An explosion proof centrifugal evaporator comprising a vacuum chamber, a rotatable head within said chamber for supporting samples of solutions from which the solvents are to be evaporated, magnetic drive means external to said chamber for rotatably driving said head, said magnetic drive means comprising a motor driven plate and a plurality of permanent magnets carried by said plate and disposed for rotation therewith to establish a rotating magnetic field within said vacuum chamber upon rotation of said plate and means within said chamber rotatably driven in response to said rotating magnetic field to effect rotation of said head wherein the wall of said chamber is lined with an electrically grounded wire mesh screen to remove static electricity.

7. A centrifugal evaporator as set forth in claim 6 further including a heating element in said chamber for accelerating the rate of the evaporation.

8. A centrifugal evaporator as set forth in claim 6 further including a heat reflector on the free face of a portion of said wire mesh screen and disposed adjacent said heating element.

9. An explosion proof centrifugal evaporator comprising a housing, a motor within said housing, a disc supported to the shaft of said motor, said disc having a plurality of permanent magnets disposed thereon in spaced relationship and adapted to be rotated upon energization of said motor to establish a rotating magnetic field, a vacuum chamber including a base of a low magnetic permeability and high electrical resistivity to allow low loss transmission of the magnetic field into the vacuum chamber, means for electrically grounding said vacuum chamber, a centrifuge within the said vacuum chamber including a shaft, a rotor for receiving samples of solutions from which the solvents are to be evaporated and a metal plate, said metal plate and rotor being disposed on said shaft at opposite ends thereof, said shaft being in axial alignment with the shaft of said motor such that said disc and said plate are positioned in spaced relationship to each other on opposite sides of said base whereby said motor and disc are isolated from said vacuum chamber and said metal plate is adapted to be rotated by said rotating magnetic field within the vacuum chamber when said motor is energized.

10. An explosion proof centrifugal evaporator as set forth in claim 9 wherein said chamber is lined with an electrically grounded wire mesh screen.

11. An explosion proof centrifugal evaporator as set forth in claim 10 further including a heating element within said vacuum chamber adapted to be energized to accelerate the rate of evaporation and a heat shield mounted to said screen and disposed adjacent said heating element.

References Cited by the Examiner

UNITED STATES PATENTS

| | | | |
|---|---|---|---|
| 2,512,604 | 6/1950 | Bierwirth | 159—6 |
| 2,536,676 | 1/1951 | Brown et al. | 149—49 |
| 2,764,534 | 9/1956 | Nerheim | 202—161 X |
| 2,803,888 | 8/1957 | Cerletti | 34—5 X |
| 2,880,979 | 4/1959 | Wheeler | 202—153 X |
| 3,080,303 | 3/1963 | Nerheim | 202—161 X |
| 3,085,407 | 4/1963 | Tomlinson | 192—84 |

NORMAN YUDKOFF, *Primary Examiner.*

JACK SOFER, *Assistant Examiner.*